United States Patent
Yurko

(10) Patent No.: US 11,904,391 B2
(45) Date of Patent: Feb. 20, 2024

(54) ADDITIVE MANUFACTURING OF ARTICLES COMPRISING BERYLLIUM

(71) Applicant: Materion Corporation, Mayfield Heights, OH (US)

(72) Inventor: James Andrew Yurko, Maumee, OH (US)

(73) Assignee: Materion Corporation, Mayfield Heights, OH (US)

( * ) Notice: Subject to any disclaimer, the term of this patent is extended or adjusted under 35 U.S.C. 154(b) by 276 days.

(21) Appl. No.: 16/707,318

(22) Filed: Dec. 9, 2019

(65) Prior Publication Data

US 2020/0108445 A1 Apr. 9, 2020

Related U.S. Application Data

(62) Division of application No. 14/965,572, filed on Dec. 10, 2015, now Pat. No. 10,500,639.

(Continued)

(51) Int. Cl.
*B22F 3/24* (2006.01)
*B22F 3/26* (2006.01)
(Continued)

(52) U.S. Cl.
CPC ............... *B22F 3/24* (2013.01); *B22F 1/102* (2022.01); *B22F 1/105* (2022.01); *B22F 1/17* (2022.01); *B22F 3/26* (2013.01); *B22F 10/16* (2021.01); *B22F 10/60* (2021.01); *C22C 1/0408* (2013.01); *C22C 25/00* (2013.01); *C22F 1/16* (2013.01);
(Continued)

(58) Field of Classification Search
CPC .......... B22F 10/20; B22F 1/102; B22F 1/105; B22F 1/17; B22F 3/24; B22F 3/26; B22F 2301/05; B22F 2302/45; B22F 2998/10; B22F 10/10; B22F 3/10; B22F 10/00; C22C 1/0408; C22C 25/00; C22F 1/16;
(Continued)

(56) References Cited

U.S. PATENT DOCUMENTS 3,325,257 A 6/1967 Ang et al.
3,506,438 A 4/1970 Krock et al.
(Continued)

FOREIGN PATENT DOCUMENTS

CN 1997475 A 7/2007
CN 101010161 A 8/2007
(Continued)

OTHER PUBLICATIONS

Speer et al. Applications of an aluminum-beryllium composite for structural aerospace components, Engineering Failure Analysis, vol. 11, Issue 6, pp. 895-902, 2004 (Year: 2004).*
(Continued)

*Primary Examiner* — Rebecca Janssen
(74) *Attorney, Agent, or Firm* — COZEN O'CONNOR

(57) ABSTRACT

A method of making an article includes depositing a plurality of layers to form a three-dimensional preform, sintering the preform to form a sintered preform, and infiltrating the preform with at least one metal to form the article. At least one layer of the plurality of layers is formed from a beryllium-containing composition including beryllium powder. The infiltrating metal can be selected from aluminum and magnesium.

19 Claims, 1 Drawing Sheet

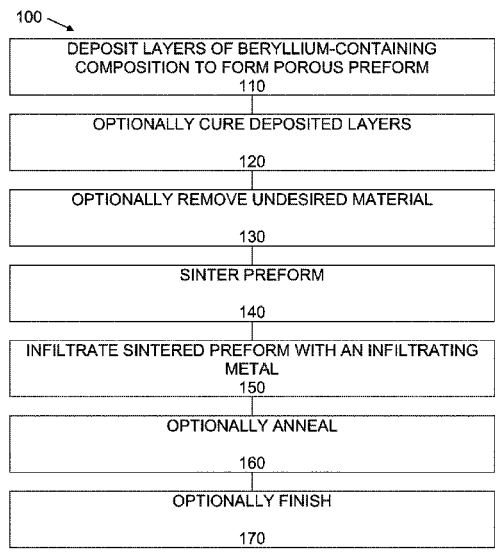

Related U.S. Application Data

(60) Provisional application No. 62/091,060, filed on Dec. 12, 2014.

(51) Int. Cl.

| | |
|---|---|
| *C22C 1/04* | (2023.01) |
| *B22F 10/16* | (2021.01) |
| *B22F 10/60* | (2021.01) |
| *C22C 25/00* | (2006.01) |
| *B33Y 80/00* | (2015.01) |
| *B22F 1/17* | (2022.01) |
| *B22F 1/102* | (2022.01) |
| *B22F 1/105* | (2022.01) |
| *C22F 1/16* | (2006.01) |
| *C23C 18/32* | (2006.01) |
| *C25D 11/34* | (2006.01) |
| *B22F 10/32* | (2021.01) |
| *B22F 10/36* | (2021.01) |
| *B22F 10/66* | (2021.01) |
| *B33Y 10/00* | (2015.01) |

(52) U.S. Cl.
CPC .............. *C23C 18/32* (2013.01); *C25D 11/34* (2013.01); *B22F 10/32* (2021.01); *B22F 10/36* (2021.01); *B22F 10/66* (2021.01); *B22F 2301/05* (2013.01); *B22F 2302/45* (2013.01); *B22F 2998/10* (2013.01); *B33Y 10/00* (2014.12); *B33Y 80/00* (2014.12)

(58) Field of Classification Search
CPC ......... C23C 18/32; C25D 11/34; B33Y 10/00; B33Y 80/00; Y02P 10/25
See application file for complete search history.

(56) References Cited

U.S. PATENT DOCUMENTS

| | | | | |
|---|---|---|---|---|
| 4,554,218 A | * | 11/1985 | Gardner | ................. B22F 1/108 419/37 |
| 5,597,589 A | | 1/1997 | Deckard | |
| 5,660,886 A | * | 8/1997 | Peterman | ................. C23C 26/00 427/376.6 |
| 5,775,403 A | * | 7/1998 | Premkumar | ........ C04B 41/5155 257/E23.188 |
| 6,036,777 A | | 3/2000 | Sachs | |
| 7,461,684 B2 | | 12/2008 | Liu et al. | |
| 7,828,022 B2 | | 11/2010 | Davidson et al. | |
| 2004/0173335 A1 | | 9/2004 | Schaffer et al. | |
| 2004/0255768 A1 | * | 12/2004 | Rettenbacher | ........ F41H 5/0421 89/36.02 |
| 2005/0275143 A1 | * | 12/2005 | Toth | ................. C04B 35/62842 264/646 |
| 2006/0045787 A1 | | 3/2006 | Jandeska, Jr. et al. | |
| 2008/0241404 A1 | | 10/2008 | Allaman et al. | |
| 2010/0043698 A1 | | 2/2010 | Bolt | |
| 2010/0279007 A1 | * | 11/2010 | Briselden | ................. C22C 32/00 427/243 |
| 2015/0361825 A1 | * | 12/2015 | Amini | ..................... F01D 5/288 415/119 |

FOREIGN PATENT DOCUMENTS

| | | |
|---|---|---|
| CN | 101861241 A | 10/2010 |
| CN | 102848634 A | 1/2013 |
| CN | 104084582 A | 10/2014 |
| CN | 104630524 A | 5/2015 |
| JP | H11515058 A | 12/1999 |
| JP | 2010202928 A | 9/2010 |

OTHER PUBLICATIONS

Materion AlBeMet AM162 Data Sheet, https://materion.com/-/media/files/beryllium/albemet-materials/maab-017albemetpropertydatasheet.pdf, last accessed Nov. 18, 2022 ("AM162") (Year: 2020).*
Miller et al., Corrosion of Beryllium (1967) (Year: 1967).
Spectrum Ztm 510 User Manual (2005) (Year: 2005).
ExOne Digital Part Materialization; www.exone.com/en/materialization/what-is-digital-part-materialization/metal.
International Search Report for corresponding PCT Application No. PCT/US2015/065069 dated Mar. 11, 2016.

* cited by examiner

100 ↘

```
┌─────────────────────────────────────────────────┐
│ DEPOSIT LAYERS OF BERYLLIUM-CONTAINING          │
│ COMPOSITION TO FORM POROUS PREFORM              │
│ 110                                             │
└─────────────────────────────────────────────────┘
                        │
┌─────────────────────────────────────────────────┐
│ OPTIONALLY CURE DEPOSITED LAYERS                │
│ 120                                             │
└─────────────────────────────────────────────────┘
                        │
┌─────────────────────────────────────────────────┐
│ OPTIONALLY REMOVE UNDESIRED MATERIAL            │
│ 130                                             │
└─────────────────────────────────────────────────┘
                        │
┌─────────────────────────────────────────────────┐
│ SINTER PREFORM                                  │
│ 140                                             │
└─────────────────────────────────────────────────┘
                        │
┌─────────────────────────────────────────────────┐
│ INFILTRATE SINTERED PREFORM WITH AN INFILTRATING│
│ METAL                                           │
│ 150                                             │
└─────────────────────────────────────────────────┘
                        │
┌─────────────────────────────────────────────────┐
│ OPTIONALLY ANNEAL                               │
│ 160                                             │
└─────────────────────────────────────────────────┘
                        │
┌─────────────────────────────────────────────────┐
│ OPTIONALLY FINISH                               │
│ 170                                             │
└─────────────────────────────────────────────────┘
```

ADDITIVE MANUFACTURING OF ARTICLES COMPRISING BERYLLIUM

CROSS-REFERENCE TO RELATED APPLICATIONS

This application is a divisional of U.S. patent application Ser. No. 14/965,572, filed Dec. 10, 2015, now U.S. Pat. No. 10,500,639, which claims priority to U.S. Provisional Patent Application Ser. No. 62/091,060, filed on Dec. 12, 2014. The entirety of that application is hereby fully incorporated by reference.

BACKGROUND

The present disclosure relates to systems and methods for manufacturing products from beryllium-containing compositions using additive manufacturing techniques. This permits complex, light-weight, and rigid parts comprising beryllium and alloys thereof to be made cheaply compared to other processes, and also permits rapid construction of such parts.

Additive Manufacturing (AM) is a new production technology for the rapid and flexible production of prototype parts, end-use parts, and tools directly from a digital model. AM makes three-dimensional (3D) solid objects of virtually any shape from a digital model. Generally, this is achieved by creating a digital blueprint of a desired solid object with computer-aided design (CAD) modeling software and then slicing that virtual blueprint into very small digital cross-sections/layers. Each layer begins with a thin distribution of powder spread over the surface of a bed or platform. The powder is selectively joined where the object is to be formed. A piston that supports the bed/platform within a build box lowers so that the next powder layer can be spread and selectively joined. This sequential layering process repeats within an AM machine (such as a three-dimensional printer) to build up the desired part. Following heat treatment, unbound powder is removed, leaving the semi-fabricated part.

AM has many advantages, including dramatically reducing the time from design to prototyping to commercial product. Demonstration units and parts can be rapidly produced. Parts can be created of any geometry, and generally out of any material, including ceramics, metals, polymers, and composites. Local control can be exercised over the material composition, microstructure, and surface texture. Running design changes are possible. Multiple parts can be built in a single assembly. No complicated potentially one-time die or tooling needs to be made before a prototype can be produced. Minimal energy is needed to make these 3D solid objects. It also decreases the amount of waste and raw materials. AM also facilitates production of extremely complex geometrical parts. Support material can be used to create overhangs, undercuts, and internal volumes. AM also reduces the parts inventory for a business since parts can be quickly made on-demand and on-site.

Two conventional AM methods include electron beam melting and laser sintering. In electron beam melting, after the deposition of metal powder, the loose metal powder cross-section is melted or fused by an electron beam. In laser sintering, a laser beam is used to sinter areas of the loosely compacted metal powder cross-section. The term "sintering" refers to the process by which particulates adhere into a solid mass due to externally applied energy. Laser sintering will also fuse a given cross-section with the already-sintered cross-section beneath. The metal powder that is not struck by the laser beam remains loose and falls away from the finished part when removed from the AM machine. Alternatively, the finished part can be depowdered by vacuuming or using a fluid such as compressed air to wash the finished part and dislodge any loose powder. Subsequent finishing steps may also be applied to the part to produce the characteristics desired. Such steps include, but are not limited to, further curing, sintering, infiltration, annealing, and final surface finishing.

A third AM method includes binder jetting. In binder jetting, after the deposition of metal powder, a liquid binding agent is selectively deposited to bond powder particles together. The finished part is developed through the layering of powder and binder. Binder jetting may result in a green finished part. The term "green part" refers to articles or preforms which are produced to be further processed with other manufacturing techniques. For example, metal green parts are further processed by sintering in an oven and infiltrating with at least one metal. The infiltration fills voids within the sintered preform.

Beryllium is a metal with highly desirable properties. These include high stiffness (Young's modulus=287 GPa), low density (1.85 g/cc), a high elastic modulus (130 GPa), high specific heat (1925 J/kg·K), high thermal conductivity (216 W/m·K), and a low coefficient of linear thermal expansion ($11.4 \times 10^6$/° K). As a result, beryllium and its composites are useful in airborne and spaceborne structures, high-performance engines and brakes, and electronic components for thermal performance and vibration damping. Beryllium and its composites are also useful in combustion applications, hypersonic vehicles, and nuclear energy growth applications.

Additionally, articles made from beryllium and beryllium intermetallics have many advantages over other metals, such as titanium and titanium alloys, including a high specific modulus and a higher temperature range for continuous usage.

However, other properties of beryllium make it difficult to make parts and structures from beryllium using AM techniques. Beryllium readily oxidizes and reacts with carbon, nitrogen, and other materials. In its molten state, beryllium also undergoes rapid grain growth. In addition, such materials are typically brittle at room temperature, which is due in part to their complex crystal structures. As a result, AM techniques which require local melting of the metal powder, like electron beam melting and laser sintering, cannot be easily applied to beryllium. It would be desirable to provide additive manufacturing techniques that can be applied to beryllium-containing compositions.

BRIEF DESCRIPTION

The present disclosure relates to methods of making articles from beryllium via additive manufacturing (AM) techniques. The articles are made from beryllium and/or alloys thereof including at least one metal, such as aluminum or magnesium.

Disclosed in various embodiments is a method of making an article, including depositing a plurality of layers to form a three-dimensional preform; sintering the preform to form a sintered preform; and infiltrating the sintered preform with at least one infiltrating metal to form the article. At least one layer of the plurality of layers is formed from a beryllium-containing composition containing beryllium powder. The infiltrating metal can be selected from aluminum and magnesium.

The beryllium-containing composition may further include a binder. In some embodiments, the binder is selected from polyethylene, polypropylene, polyvinyl alcohol, collodion, or silicates. The beryllium-containing composition may include from 0.1 to 99.9 wt % of the binder and from 0.1 to 99.9 wt % of the beryllium powder.

In some embodiments, the beryllium powder includes beryllium particles coated with nickel. The beryllium powder may include from about 92 wt % to less than 100 wt % beryllium and from greater than zero wt % to about 8 wt % nickel.

In some embodiments, the article includes from 0 to about 5 wt % nickel, from about 58 to about 65 wt % beryllium, and from about 30 to about 42 wt % aluminum.

The depositing may be performed at about room temperature.

In some embodiments, the methods further include curing the plurality of layers prior to sintering the preform. The methods can further include removing loose powder prior to sintering and after curing.

Sometimes, the article is annealed. The annealed article can be finished, for example by polishing or plating.

Also disclosed are articles formed by the methods therein. Generally, these articles are formed from an alloy of beryllium with at least one other metal, such as aluminum or magnesium. The articles may have any combination of the following properties: a density of about 1.5 g/cc to about 2.5 g/cc; a coefficient of thermal expansion at 25° C. of from about 5 ppm/° C. to about 25 ppm/° C.; an elastic modulus of about 100 GPa to about 300 GPa; a yield strength of about 150 MPa to about 900 MPa; and/or an ultimate tensile strength of from about 170 MPa to about 1000 MPa.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

The FIGURE is a flow chart illustrating an exemplary embodiment of a method of making an article according to the present disclosure.

DETAILED DESCRIPTION

The present disclosure may be understood more readily by reference to the following detailed description of desired embodiments and the examples included therein. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

Numerical values in the specification and claims of this application, as they relate to polymers or polymer compositions, reflect average values for a composition that may contain individual polymers of different characteristics. The numerical values disclosed herein should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The present disclosure may refer to temperatures for certain process steps. It is noted that these generally refer to the temperature at which the heat source (e.g. furnace, oven) is set, and do not necessarily refer to the temperature which must be attained by the material being exposed to the heat.

The present disclosure relates to methods of making an article from beryllium using additive manufacturing (AM) techniques. The FIGURE illustrates the general steps of the methods 100 of making an article according to the present disclosure. In step 110, a multitude of layers of a first, beryllium-containing composition are deposited in a predetermined pattern to form a three-dimensional preform. In optional step 120, the plurality of layers is cured to promote cohesion between adjacent layers to form a cured preform. In optional step 130, loose particles of the first composition are removed from the cured preform, for example by vacuuming. In step 140, the un/cured preform is sintered to form a sintered preform. This sintered preform is relatively porous. Next, in infiltrating step 150, the sintered preform is infiltrated with a metal to form the article. In optional step 160, the article can be annealed. In optional step 170, the annealed article is finished to obtain a smooth surface, for example by polishing or plating.

The beryllium-containing composition includes beryllium powder. The beryllium particles may be primarily composed of pure beryllium or a beryllium alloy. Exemplary beryllium alloys include binary alloys containing from about 35 wt % to about 35 wt % beryllium and from about 35 wt % to about 65 wt % aluminum, which are commercially available as AlBeMet® from Materion Corporation. Specific beryllium metals include S-65 grade (99.2% minimum Be content, 0.9% max BeO), S-200 (98.5% minimum Be content), B-26, I-220 (Hot Isostatically Pressed beryllium, minimum 98% Be content), O-30 (Hot Isostatically Pressed beryllium, minimum 99% Be content, 0.5% max BeO), and UHP 9999 (99.99% minimum Be content), all available from Materion Corporation.

The beryllium powder may have a particle size of from about 1 micron to about 200 microns, including from about 25 microns to about 70 microns. The particle size is the D50, or the diameter at which a cumulative percentage of 50% of the particles by volume is attained. Put another way, 50% of a given volume of particles has a lower diameter and 50% of the particles have a greater diameter.

In some embodiments, the beryllium powder is the only component in the beryllium-containing composition. In these embodiments, the beryllium powder is in the form of particles having a core-shell structure, with the beryllium making up the core and a coating making up the shell. The shell isolates the beryllium from the ambient environment so as to reduce/prevent oxidation or reaction with the binder (often carbon-based). In some embodiments, the coating includes nickel, either pure nickel or in the form of a nickel alloy. The core may be from 0.1 wt % to 99.9 wt % of the particles, or from 50 wt % to 99.9 wt %, or from about 92 wt % to less than 100 wt % of the particles. In some embodiments, the coating may be from 0.1 wt % to 99.9 wt % of the particles, or from 0.1 wt % to 50 wt %, or from greater than zero wt % to about 8 wt % nickel. In particular embodiments, the beryllium powder includes from about 92 wt % to less than 100 wt % beryllium and from greater than zero wt % to about 8 wt % nickel. Generally, it is contemplated that the coating becomes part of the finished article.

In other embodiments, the beryllium powder is mixed with a suitable binder which isolates the beryllium from the ambient environment. The binder may be selected based on the chemical and physical properties of the beryllium containing compositions disclosed herein. Some non-limiting examples of binders include furan, phenolic, and aqueous-based binders. Further non-limiting examples of binders include polyethylene, polypropylene, polyvinyl alcohol, collodion, or silicates. In these embodiments, the beryllium-containing composition contains from 0.1 to 99.9 wt % of the beryllium powder. The beryllium-containing composition also contains from 0.1 to 99.9 wt % of the binder. Usually, the beryllium powder is the majority (by weight) of the beryllium-containing composition. It is contemplated that the binder is "burned off" during the sintering, and does not react with the beryllium. In these embodiments including a binder, the beryllium powder can be uncoated, or can be of a core-shell structure as described above, depending upon the end use.

A three-dimensional preform is then made from the beryllium-containing composition using an additive manufacturing (AM) system. An exemplary AM system is a three-dimensional printer including a build box and supply sources. The build box comprises a build platform, side walls, a gantry, and at least one deposition head (usually at least two). The build platform is generally a flat surface on which layers of the beryllium-containing composition are deposited. The build platform moves along a vertical z-axis relative to the gantry based on signals provided from a computer-operated controller. The side walls cooperate with the build platform to form a "box" that contains the deposited powder. Generally, the side walls remain in a fixed location, and the build platform moves downward to permit the next layer of powder to be deposited.

The gantry is desirably configured to move the deposition head(s) in a horizontal x-y plane about the build box based on signals provided from the controller. The horizontal x-y plane is a plane defined by an x-axis and a y-axis where the x-axis, the y-axis, and the z-axis are orthogonal to each other. Other similar arrangements may also be used such that the build platform and the deposition head(s) are moveable relative to each other. The build box is generally enclosed by a housing, so that an inert gas can be used during the AM process.

The deposition head(s) are used to deposit the beryllium-containing composition at a specified location on the build platform. It is contemplated that in embodiments, two such deposition heads are present. One deposition head is used to deposit the beryllium-containing composition. Another deposition head may be used to deposit a support material. The support material is used to provide support to the beryllium-containing composition, so that the final desired shape of the article can be obtained. For example, the support material can be deposited in a lower layer to support overhanging beryllium that will be placed directly above the support material in an upper layer located upon the lower layer. Once the beryllium-containing composition has been hardened, the support material can be removed, for example by being washed away or vacuumed away. Exemplary support materials include casting sand and polymers.

The deposition head(s) are generally mounted in fixed relation to each other, and move relative to the build platform via the gantry. Each deposition head is also connected to a supply source for the material to be deposited by that particular head. Material is deposited through the deposition head through a nozzle or orifice.

In the AM processes of the present disclosure, a multitude of layers of the beryllium-containing deposition are deposited in a preset pattern. The preset pattern for each layer is determined so that the combined layers form the desired article. Each layer is formed from the beryllium-containing composition. Generally, each layer is deposited upon or adjacent to another layer, so that there is some portion of beryllium-containing composition in each layer that contacts a portion of beryllium-containing composition in another layer. The thickness of each layer can range from about 10 micrometers (μm) to about 120 μm. The deposition of the beryllium-containing composition is generally performed at room temperature. Again, if desired, this deposition can be performed in the presence of an inert noble gas, such as argon.

When the beryllium-containing composition is in the form of a powder, the powder particles should be uniformly deposited at a relatively high rate. The powder particles can preferably be packed at relatively high densities, except where parts having greater porosity are desired. Known techniques used in the fields of colloidal science and powder dispersion chemistry can be used to provide the desired uniform depositions of such powders at the required rates and densities. When the beryllium-containing composition contains a binder, the beryllium-containing composition can be heated and then extruded in the form of a molten monofilament.

After each layer is deposited, the layer is then partially cured by exposure to a heat source. It is contemplated that this partial curing causes the shell of the core-shell particle or the binder to become tacky, promoting binding of the beryllium-containing composition, both within a given layer and between layers.

In particular embodiments, the steps of depositing the beryllium-containing deposition layer and partially curing the layer are repeated. The resulting combination of layers results in the formation of a three-dimensional preform. The preform is very porous, and typically consists of from about 30 volume percent (vol %) to about 60 vol % of the beryllium-containing composition, with the remainder being void space.

In some embodiments, after a powder layer of the beryllium-containing composition is deposited, the deposited layers may be cured by exposure to a heat source prior to selectively sintering or melting the powder layer. After depositing the powder layer and optionally curing the layer, the powder layer is selectively sintered or melted based on a preset pattern based on signals provided from the controller. In some embodiments, the preset pattern is determined based on the layers of a CAD model. The sintering or melting may be performed using an electron beam or a laser beam. In some embodiments, the electron beam or laser beam has a power density of from about $10^4$ W/mm$^2$ to about $10^7$ W/mm$^2$. The sintering or melting can be performed under a vacuum or in the presence of an inert noble gas, such as argon. The steps of depositing a powder layer, optionally curing the layer, and sintering or melting the layer, are repeated until a three dimensional preform is formed.

In other embodiments, after a powder layer of the beryllium-containing composition is deposited, a liquid binding agent is selectively deposited to bond powder particles together. The binding agent is selected from furan, phenolic, silicate, and aqueous-based binders. The powder layer of the beryllium-containing composition and the binding agent are selectively deposited based on a preset pattern based on signals provided from the controller. The preset pattern may be determined based on the layers of a CAD model. The steps of laying out powder and binding agent are repeated until a three dimensional preform is formed.

Next, the porous preform can be completely cured 120 to produce green strength for handling, and to promote cohesion between adjacent layers. Curing may be performed in an oven. The curing may be performed for a time period of from about 6 to about 12 hours, including about 9 hours. Again, this is the temperature at which the heat source is set, not necessarily the temperature attained by the preform. Also, again, as desired, the curing can be performed in the presence of an inert noble gas, such as argon. This curing usually densifies the preform.

After the curing, the preform is separated 130 from any undesired material, for example loose powder, the support material, etc. This can be done, for example, by vacuuming, or by blowing. As desired, these materials can be recycled.

The preform is then sintered 140 to form a sintered preform. The sintering 140 may be completed in a crucible (e.g., a graphite crucible). The sintering "burns off" any binder that may be present and causes metallurgical bonding of the metal particles, including the beryllium itself. After sintering, the sintered preform may have a porosity in the range of from about 30 volume percent (vol %) to less than 100 vol %. As desired, the sintering can be performed under a vacuum or under an inert noble gas, such as argon.

Next, the sintered preform is infiltrated 150 with at least one metal. Exemplary metals include aluminum, magnesium, lithium, and alloys thereof. The infiltration fills voids within the sintered preform. As a result, the relative density of the article is increased to about 90% to 100%. The relative density is the ratio of the actual article to the density the article would have if it contained no voids, and is different from porosity. Typically, the preform is made with a stilt, and the infiltrating metal wicks into the preform through the stilt. The stilt is then removed after processing to obtain the article.

In particular embodiments, the infiltration is performed with only aluminum. In other embodiments, the infiltration is performed with only beryllium. Depending on the materials in the beryllium-containing compostion, the resulting article may be composed entirely of (1) only beryllium or aluminum, or (2) only beryllium and magnesium. If the beryllium is in the form of nickel-coated particles, the resulting article may be composed entirely of (3) only beryllium, nickel, and aluminum; or (4) only beryllium, nickel, and magnesium. As discussed above, the beryllium powder itself might be an alloy, for example with aluminum. Depending on the surface energy of the sintered preform, infiltration may need to be performed at pressures ranging from about 1 to about 1000 atmospheres of pressure.

Next, the sintered article is generally annealed 160. Annealing typically refers to a heat treatment in which the temperature is raised, and the material is then slowly cooled to room temperature. The sintering, infiltrating, and annealing can be performed consecutively. Because of the high temperatures used in the sintering and infiltrating, the annealing here generally consists of the cooling only. Annealing may lower the tensile strength and yield strength of the article, making the article less brittle for handling and optional post machining (e.g., milling, drilling, and tapping).

If desired, the article can then be finished 170. The finishing may include polishing and/or plating the article. The surface roughness of the article may be reduced, for example, via bead blasting or barrel finishing. Typical aluminum protective coatings can be applied, such as Alodine or cadmium over nickel, or electroless nickel plating or anodization.

The methods and processes described herein are contemplated as being able to produce complex, light-weight parts with high stiffness, and to do so cheaper and more quickly than other processes.

It is contemplated that the Al—Be or Mg—Be or Al—Mg—Be or Al—Be—Ni or Al—Mg—Be—Ni composition of the article would permit more contaminants or alloying elements to be present, compared to higher purity metal products, while still obtaining very similar or identical properties of those higher purity metal products. These additive manufacturing processes are also generally easier and cheaper than manufacturing processes that must be used with higher purity beryllium products.

In particular embodiments, the article contains from 0 wt % to about 5 wt % nickel, from about 58 wt % to about 65 wt % beryllium, and from about 30 to about 42 wt % aluminum.

The articles may have any combination of the following properties: a density of about 1.5 g/cc to about 2.5 g/cc; a coefficient of thermal expansion at 25° C. of from about 5 ppm/° C. to about 25 ppm/° C.; an elastic modulus of about 100 GPa to about 300 GPa; a yield strength of about 150 MPa to about 900 MPa; and/or an ultimate tensile strength of from about 170 MPa to about 1000 MPa.

It is contemplated that the resulting articles having aluminum-beryllium metal matrices can combine the high modulus and low-density characteristics of beryllium with the fabrication and mechanical properties of aluminum. These include high specific stiffness with good processing characteristics. For example, the articles should be weldable, insensitive to machining damage, and should not require etching after machining like beryllium. They should have good elastic modulus, low density, and high heat capacity. A high modulus-to-density ratio minimizes flexure and reduces the chance of mechanically induced failure. The high thermal conductivity permits use as a heat sink. The contemplated low CTE should match that of common ceramic chip carriers more closely than other materials such as aluminum alone. The better the CTE match, the less strain imposed on solder joints, increasing the fatigue life of solder joints and resulting in longer lifetime for circuit boards.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A beryllium-containing composite that is an additive manufactured article, the composite comprising:
    a three-dimensional porous beryllium-containing sintered preform consisting of a plurality of interconnected beryllium-containing deposition layers and a plurality of sintered preform voids, and
    an infiltrating metal matrix disposed within the plurality of sintered preform voids, wherein the infiltrating metal matrix includes beryllium, aluminum, magnesium, alloys thereof, or combinations thereof; and
    wherein the additive manufactured article has a composition of Al—Be, Mg—Be, Al—Mg—Be, Al—Be—Ni, Al—Mg—Be—Ni, or combinations thereof.

2. The composite of claim 1, wherein the three-dimensional porous beryllium-containing sintered preform includes beryllium and at least one of nickel, aluminum, alloys thereof, or combinations thereof.

3. The composite of claim 2, wherein the sintered preform includes from zero to 8 wt % nickel.

4. The composite of claim 2, wherein the sintered preform includes from 35 wt % to 65 wt % beryllium and from 35 wt % to 65 wt % aluminum.

5. The composite of claim 1, wherein the infiltrating metal matrix is aluminum.

6. The composite of claim 1, wherein the infiltrating metal matrix is magnesium.

7. The composite of claim 1, wherein the composite has a composition of from 0 wt % to 5 wt % nickel, from 58 wt % to 65 wt % beryllium, and from 30 wt % to 42 wt % aluminum.

8. The composite of claim 1, wherein the composite demonstrates a density of about 1.5 g/cc to about 2.5 g/cc.

9. The composite of claim 1, wherein the composite demonstrates a coefficient of thermal expansion at 25° C. of from about 5 ppm/° C. to about 25 ppm/° C.

10. The composite of claim 1, wherein the composite demonstrates an elastic modulus of from 100 GPa to 300 GPa.

11. The composite of claim 1, wherein the composite demonstrates a yield strength of from 150 to 900 MPa.

12. The composite of claim 1, wherein the composite demonstrates an ultimate tensile strength of from 170 MPa to 1000 MPa.

13. The composite of claim 1, wherein the composite is finished by coating, polishing, plating, or combinations thereof.

14. The composite of claim 13, wherein the composite includes a protective coating of aluminum, cadmium, nickel, or combinations thereof.

15. The composite of claim 14, wherein the composite includes a protective coating of aluminum.

16. The composite of claim 1, wherein the composite is weldable.

17. The composite of claim 1, wherein the three-dimensional porous beryllium-containing sintered preform is a majority by weight beryllium.

18. The composite of claim 1, wherein each beryllium-containing deposition layer consists of less than 100 wt % beryllium and from greater than zero wt % to about 8 wt % nickel.

19. The composite of claim 1, wherein beryllium particles in the interconnected beryllium-containing deposition layers are metallurgically bonded together.

* * * * *